United States Patent [19]

Touro et al.

[11] Patent Number: 5,147,618
[45] Date of Patent: Sep. 15, 1992

[54] PROCESS FOR RECOVERY OF GOLD FROM REFRACTORY GOLD ORES USING SULFUROUS ACID AS THE LEACHING AGENT

[75] Inventors: Freddie J. Touro; Tadeusz K. Wiewiorowski, both of New Orleans, La.

[73] Assignee: Freeport-McMoRan Inc., New Orleans, La.

[21] Appl. No.: 703,843

[22] Filed: May 21, 1991

[51] Int. Cl.$^5$ ............... C01G 7/00; C22B 3/06; C22B 11/06
[52] U.S. Cl. .................... 423/27; 423/28; 423/36; 423/37; 423/39; 75/736
[58] Field of Search ............... 423/27, 28, 36, 37, 423/39; 75/736

[56] References Cited

U.S. PATENT DOCUMENTS

| | | | |
|---|---|---|---|
| 3,235,328 | 2/1966 | Lerner et al. | 423/60 |
| 4,289,532 | 9/1981 | Matson et al. | 75/105 |
| 4,552,589 | 11/1985 | Mason et al. | 75/105 |
| 4,662,938 | 5/1987 | Whitney et al. | 423/39 |
| 4,668,289 | 5/1987 | Langer et al. | 423/27 |
| 4,723,998 | 2/1988 | O'Neil | 75/101 |
| 4,738,718 | 4/1988 | Bakshani et al. | 75/105 |
| 4,902,345 | 2/1990 | Ball et al. | 423/27 |
| 4,919,715 | 4/1990 | Smith et al. | 75/423 |
| 5,051,128 | 9/1991 | Kubo | 75/736 |
| 5,055,199 | 10/1991 | O'Neill et al. | 423/29 |

FOREIGN PATENT DOCUMENTS 3740680  6/1989  European Pat. Off. ........... 423/27

Primary Examiner—Theodore Morris
Assistant Examiner—P. L. Hailey
Attorney, Agent, or Firm—Fisher, Christen & Sabol

[57] ABSTRACT

A process for recovering gold from refractory gold-bearing ores uses sulfurous acid as the leaching agent to form a gold-sulfite complex. The ore is ground, slurried blended with a chelating agent and then subjected to a simultaneous dissolved SO$_2$ leaching and anion exchange resin adsorption step in the presence of dissolved oxygen. The gold transfers to the resin which is later separated from the resin by chemical stripping.

52 Claims, 1 Drawing Sheet

PROCESS FOR RECOVERY OF GOLD FROM REFRACTORY GOLD ORES USING SULFUROUS ACID AS THE LEACHING AGENT

FIELD OF THE INVENTION

This invention relates to a method for the recovery of gold from refractory gold ores. More particularly, the invention relates to a process for recovering gold from refractory gold-bearing ores using sulfurous acid in the form of dissolved $SO_2$ as the leaching agent and resin-in-pulp as a gold adsorbent to recover the gold.

BACKGROUND OF THE INVENTION

Refractory gold ores are ores that are generally not amenable to standard cyanidation gold extraction methods as known in the art. Conventional straight cyanidation gold extraction methods typically facilitate less than about 50% gold extraction when used on refractory gold ores. Gold-bearing ores are often refractory because of their content of the organic carbonaceous and/or sulfidic matter which inhibits or substantially reduces extraction of gold using these conventional cyanidation techniques. Such refractory ores may be found in Nevada and other states in the United States, as well as in other countries throughout the world. It is not completely understood, in all instances, why the sulfidic matter and the organic carbonaceous materials cause such ores to be refractory, but the phenomenon and the resistance to conventional cyanidation extraction is well known in the gold mining industry. In some deposits in particular, the ore is refractory because its gold content is encapsulated in mineral entities of the ore which are not attacked by conventional cyanidation processes.

A number of processes have been developed to treat refractory gold ores to make the ores more amenable to conventional gold recovery methods. For example, some ores which owe their refractory nature to their content of organic carbonaceous matter can be handled efficiently by using the process taught in commonly assigned U.S. Pat. No. 4,289,532 to Matson et al. This process treats carbonaceous ores with an oxidation step utilizing chlorine to oxidize the carbonaceous matter prior to a cyanide leach step. Although this process was intended primarily to treat ores containing carbonaceous matter, the process has also been found effective in treating gold ores containing low levels of sulfidic compounds in addition to carbonaceous matter. The sulfidic compounds are oxidized by contact with chlorine. However, when high sulfide concentrations are present in the ore, excessive quantities of chlorine are required and the process becomes more costly. Other treatment techniques, such as autoclaving or roasting, may be necessary for ores containing high concentrations of sulfidic compounds.

Two processes utilizing autoclaving to treat refractory ores are described in U.S. Pat. No. 4,552,589 to Mason et al and commonly assigned U.S. Pat. No. 4,738,718 to Bakshani et al. Numerous patents teach roasting processes for handling refractory ores. One such patent is commonly assigned U.S. Pat. No. 4,919,715 to Smith et al. The process of this patent is specifically directed to treating refractory sulfidic and carbonaceous ores.

In addition to the ore treatment steps described, the above-noted processes have the disadvantage of requiring a cyanide leach step to recover the gold from the treated ore. While cyanide leaching has been an extremely effective means of recovering gold from most ores, concern about the potential toxic effects of cyanide has been increasing in recent years. For example, tightened tolerance levels of the cyanide content of ground water and discharge water have been set in several states and the trend toward such tightened standards will probably continue. Because of the increased concern over the toxicity of cyanide, considerable research has been directed in recent years toward finding an effective substitute for cyanide in gold leaching operations without sacrificing gold recoveries.

The potential toxicity of cyanide is not the only driving force for research in developing alternative gold leaching agents. As easily processed gold ores become exhausted, refractory ores of various types will have to be handled. Because of the chemical characteristics of some of these refractory ores, cyanide is not always the most effective leaching agent.

Two leaching compounds, acidic thiourea and thiosulfate, have received considerable attention in the gold industry. The two compounds have been found effective for leaching some ores, and ineffective, or uneconomical, for leaching most other ores.

Some attention has also been redirected to chlorine which was the most widely used gold leaching agent prior to being displaced by the more efficient cyanide at the turn of the century. For example, commonly assigned U.S. Pat. No. 4,723,998 to O'Neil uses a simultaneous chlorine leach and ion exchange resin adsorption procedure to recover gold from carbonaceous ores.

None of the alternative leaching agents and methods discussed above have been sufficiently effective in terms of cost efficiency and gold recoveries to replace cyanide as the universal leaching agent in the gold industry.

There is obviously still a need in the gold mining industry for an effective and efficient leaching agent which can, at least partially, replace or supplement cyanide leaching. The present invention is directed to a non-cyanide leaching agent which is effective in recovering gold values from many refractory gold ores. The gold values are recovered from the refractory ore using dissolved $SO_2$ to form a gold-sulfite complex which is then separated from the ore slurry.

SUMMARY OF THE INVENTION

The present invention is directed to a process for recovering gold from refractory gold-bearing ores which are not otherwise amenable to conventional leaching techniques. In the preferred embodiment of the invention, the process utilizes dissolved $SO_2$ in the form of sulfurous acid as the gold leaching agent to form a water soluble gold-sulfite complex. An anion exchange resin as a gold adsorbing agent is then used to recover the gold complex from solution.

In the preferred mode of the invention, ground refractory ore feed is slurried with water to produce an ore slurry. The ore feed is ground to 100% $-65$ Tyler mesh, and preferably to 100% $-100$ Tyler mesh, and the solids content of the slurry should be between 35% and 55%, and preferably between 40% and 50% by weight. Aqueous sulfurous acid or gaseous $SO_2$ is then added to the slurry. In a preferred embodiment a chelating agent is added to the slurry before the $SO_2$ addition to sequester any alkaline earth ions present and/or formed in the aqueous phase of the slurry. Sufficient $SO_2$ is added to adjust the slurry pH to about 3.0 to 5.0.

The amount of $SO_2$ added to the slurry is preferably about 30 to 100 pounds per ton of ore depending on the composition of the ore. When gaseous or liquid $SO_2$ is used as the source of sulfurous acid, the $SO_2$ is added at sufficiently fast rate to complete the $SO_2$ addition in about 0.5 to 2.0 hours. In a preferred form of the invention a mild oxidizing agent is added to the slurry simultaneously with the $SO_2$ addition. The mild oxidizing agent, preferably an oxygen-containing gas, such as air or oxygen, is added to prevent gold recovery losses due to gold reduction. An anion exchange resin is next added to the ore slurry. The sulfurous acid leaching operation continues as a simultaneous sulfurous acid leaching and resin adsorption operation. The leaching and adsorption operation is preferably carried out in a series of stages in a resin-in-pulp (RIP) circuit, where the ore slurry flows countercurrent to the direction of flow of the resin. The addition of $SO_2$ to the ore slurry is generally continued in one or more stages of the RIP circuit, and is then discontinued, but the addition of the oxygen-containing gas continues in the remaining stages. After $SO_2$ addition is discontinued, the pH of the ore slurry tends to rise, via reaction of the natural alkalinity of the ore, to a value of about 6.0 to about 8.0. The anion exchange resin containing the adsorbed gold complex is recovered from the slurry and the gold values are then removed from the resin by chemical stripping.

In an alternative preferred embodiment, the process is carried out as a heap leach process where an aqueous solution of sulfurous acid is applied to the crushed or ground ore. The sulfurous acid solution is applied to the ore at a rate and concentration to form the sulfite complex in a manner similar to the slurry process.

BRIEF DESCRIPTION OF THE DRAWINGS

A preferred embodiment of the invention is shown in FIG. 1 which is a flowsheet diagram illustrating a preferred mode of operation of the process of this invention.

DETAILED DESCRIPTION OF THE INVENTION

Figure 1:
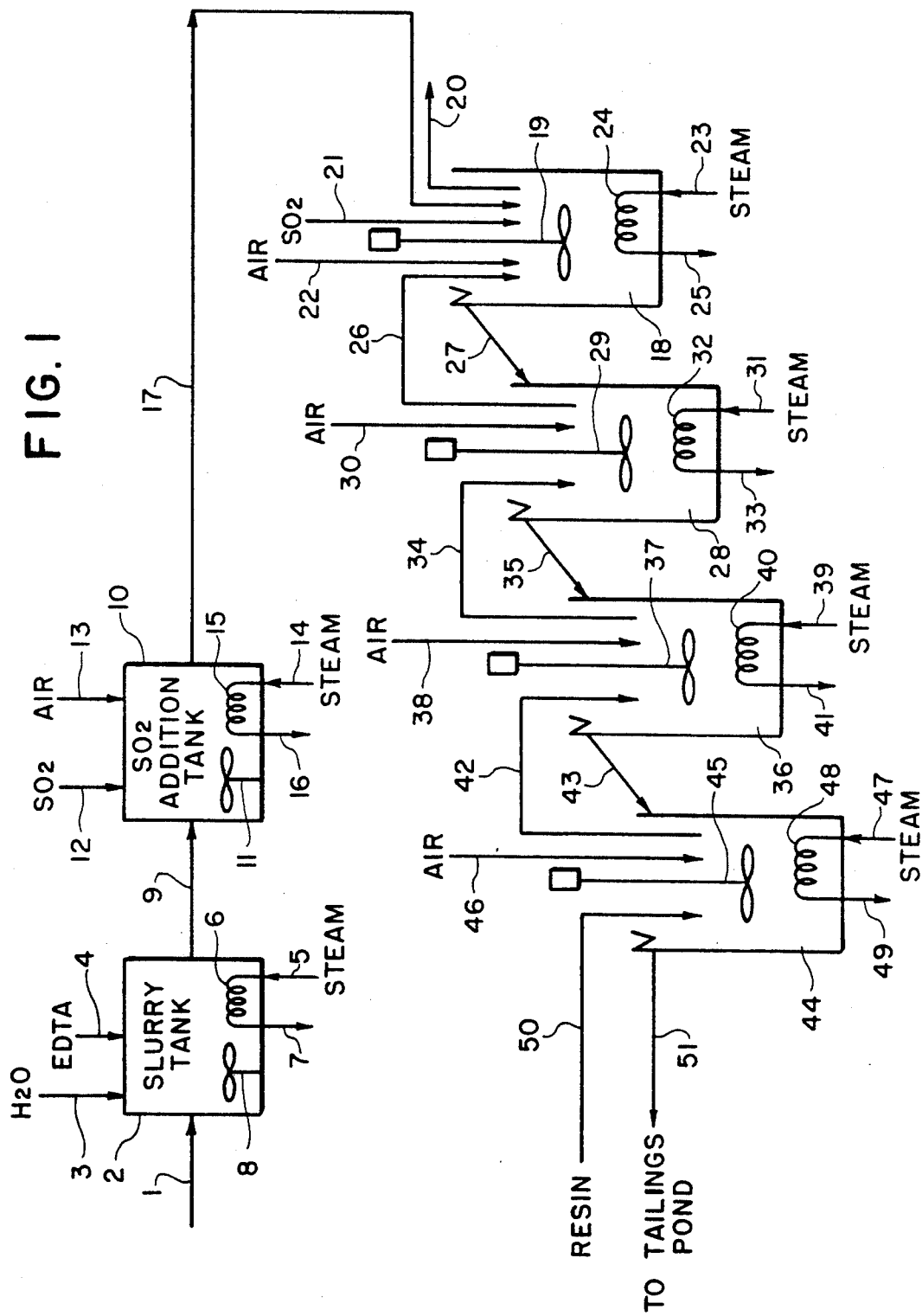

Many of the disadvantages and limitations of the previous gold leaching and recovery process are obviated by the present invention while providing a process that does not generate toxic wastes and eliminates pretreatment steps. The present invention is directed to a process of recovering gold values from refractory gold-containing ores without the need of a pretreatment step to oxidize the carbonaceous or sulfidic refractory matter and without the need for a cyanide leach step. More specifically the invention is directed to a gold leaching process for refractory gold-containing ores using a source of sulfurous acid as the leaching agent.

In a preferred embodiment of the invention an aqueous slurry of crushed and ground refractory, gold-containing ore is introduced into a leaching tank. A chelating agent, such as EDTA, is then added to the ore slurry. A source of sulfurous acid and a mild oxidizing agent are then added to the slurry to leach the gold from the ore. Preferably the source of sulfurous acid is gaseous $SO_2$ that is dissolved in the aqueous phase of the slurry to form sulfurous acid. Alternatively the source of sulfurous acid may be liquified $SO_2$ or aqueous sulfurous acid. The mild oxidizing agent is preferably an oxygen-containing gas, such as air or oxygen. The sulfurous acid is allowed to react with the gold values to form soluble sulfite complexes. The slurry is then contacted with an anion exchange resin to adsorb the solubilized gold. The loaded anion exchange resin is then separated from the slurry and eluted to strip the gold-sulfite complex from the resin and to recover the gold.

Although the exact reactions and mechanisms involved in the process of the present invention are not completely understood, the process is believed to be based on the presence of sulfurous acid in the aqueous ore slurry as the leaching agent. In one embodiment of the invention using gaseous sulfur dioxide, the gas is bubbled into the aqueous slurry using conventional injection and mixing apparatus. Sulfur dioxide is very soluble in water and easily forms sulfurous acid by the reaction:

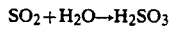

$$SO_2 + H_2O \rightarrow H_2SO_3$$

The sulfurous acid has been found to effectively react with gold in the aurous state having a valence of (+1) to form a soluble gold-sulfite complex. Sulfurous acid does not readily dissolve gold that is present in the ore in the elemental (0) state. Thus, most native gold ores mined in the past, such as oxide ores containing elemental gold, would not respond well to the process of this invention.

In recent years, as non-refractory gold ore deposits have become largely depleted, and as the price of gold has increased, more attention in the industry has been directed to gold ores which are refractory because of their content of carbonaceous matter. In many of these carbonaceous ores, the gold is believed to be in the aurous state and the present inventors discovered that this aurous gold in the ore is easily solubilized by sulfurous acid.

The ore in a preferred embodiment is a refractory gold ore containing organic carbonaceous matter, sulfidic matter and mixtures thereof. Preferably the ore has a substantial portion of the gold present in the aurous state. Sulfurous acid has been found to extract gold from some extremely refractory ores containing high concentrations of organic carbonaceous material, which otherwise yield no measurable extraction by conventional cyanide leaching. However, sulfurous acid is not a universal gold leaching agent. This invention is not directly applicable to gold in the metallic state, as found in most noncarbonaceous oxidized gold-containing ores. Other types of refractory gold ore deposits that do not yield their gold values to sulfurous acid easily are those which owe their refractory nature to gold encapsulation. For example, some pyritic ores with encapsulated gold may not respond well to any direct leaching technique, including sulfurous acid leaching. It is believed that some of these refractory ores encapsulate the gold in the pyritic material and the sulfurous acid cannot penetrate the encapsulating pyritic material to attack the encapsulated gold. However, if sufficient porosity is present or the ore is made porous by suitable treatments, ore deposits containing sulfidic matter may respond to sulfurous acid leaching, especially when carbonaceous matter is also present.

The source of sulfurous acid used in the present invention may be any convenient source as well known in art. In a preferred form of the invention, the sulfurous acid is formed in the ore slurry by the addition of sulfur dioxide. The sulfur dioxide is preferably in gaseous form, although liquified sulfur dioxide may also be used. The sulfur dioxide is preferably injected or bubbled through the slurry at a rate sufficient to completely dissolve the sulfur dioxide in the water. It is desirable to complete sulfur dioxide injection into the slurry relatively quickly. Preferably the sulfur dioxide injection is completed within 0.5 to 2 hours. It has been found that if the sulfur dioxide is injected at a slower rate more sulfur dioxide will be required to reach the optimum pH of the ore slurry. The amount of sulfur dioxide added to the slurry is about 20 lbs. to about 150 lbs. per ton of ore, and preferably about 30 to 100 lbs. per ton of ore. The actual amount of sulfur dioxide added will depend largely on the composition of the ore, since alkaline components of the ore may react with the sulfurous acid. The pH of the slurry during the leaching stage is brought to between about pH 3 and about pH 5, and preferably between pH 4 and pH 5. It has been found that the most efficient gold recovery occurs in this pH range. Preferably the sulfur dioxide or source of sulfurous acid is added at a rate sufficient to maintain the pH in the desired range.

In the preferred form of the invention a mild oxidizing agent is added to the slurry simultaneously with the source of sulfurous acid to obtain optimum gold recovery efficiency. In the preferred embodiment of the invention the oxidizing agent is an oxygen-containing gas, such as air or oxygen, although other mild oxidizing agents can be used. The oxygen-containing gas, when injected into the ore slurry, dissolves and is believed to prevent the aurous gold from being reduced to its elemental state, thereby keeping the gold in the state where it is most susceptible to sulfurous acid leaching. The probable gold-sulfite complexes formed in the reaction are:

$(HO_3S-Au-SO_3H)^{-1}$ at about pH 3 to 5

$(HO_3S-Au-SO_3)^{-2}$ at about pH 5 to 7

$(O_3S-Au-SO_3)^{-3}$ at about pH >7

The first gold complex listed, $(HO_3S-Au-SO_3H)^{-1}$, is believed to be formed at the lower pH values of about pH 3 to pH 5. After the sulfurous acid source addition is discontinued, the effect of the natural alkalinity contained in the ore causes the pH of the ore slurry to rise. The rise in the pH promotes the formation of the other two complexes. Although the second and third complexes, because of their higher charges, may adsorb onto a resin more easily than the first complex, all of the gold complexes are adsorbed satisfactorily by anion exchange resins throughout the entire pH operating range.

A supply of an oxygen-containing gas is desirable during the formation of these gold complexes. It should be noted, however, that too much oxygen in the slurry can rapidly oxidize sulfurous acid to sulfuric acid which is not effective in leaching gold values. It is, therefore, necessary to maintain the oxygen and sulfurous acid content in balance. A volumetric ratio of $SO_2$ to air of 1:1 during $SO_2$ injection as been found to be effective in leaching the gold values. The actual oxygen requirement depends on the ore type, but most importantly, the slurry should preferably not be allowed to be depleted of oxygen or other oxidant to maximize gold extraction. Thus, air addition to the slurry is preferably continued throughout the leaching and adsorption process, so as to provide between about 10 and 100 lbs. of oxygen per ton of ore.

In preferred embodiments of the invention, chelating agents are added to the slurry to sequester calcium, magnesium and other alkaline earth metal ions in the aqueous phase of the slurry. The addition of a chelating agent has been found to improve gold recovery in some ores. It is believed that the chelating agent controls precipitation of insoluble salts and retards blocking of the pores of the ore particles by insoluble salts. Sequestering the metal ions is believed to promote good contact between the gold within the ore particles and the sulfurous acid leaching agent. For example, the use of EDTA as a chelating agent has been found to improve gold recovery in some ores by about 5% to 10% compared to ore slurries without a chelating agent.

Although ethylenediaminetetraacetic acid (EDTA) is a preferred chelating agent, other chelating agents may be effective. Examples of chelating or sequestering agents which may be used include nitrilotriacetic acid, diethylenetriaminepentacetic acid, methanediphosphonic acid, dimethylaminomethane-1,1 diphosphonic acid, aminotrimethylenetriphosphonic acid, sodium hexamethaphosphate and 1-hydroxyethane-1,1 diphosphonic acid. The chelating agent is preferably added to the slurry before the addition of sulfurous acid or sulfur dioxide. The amount of chelating agent added will vary depending largely on the mineral composition of the particular ore. The chelating agent is added in the amount of about 0.04 to about 2.0 pounds of agent per ton of ore and preferably about 0.8 to about 1.4 pounds of agent per ton of ore. For example, EDTA has been found to be effective when used in the amount of about 1 pound of EDTA per ton of ore.

Sulfurous acid is not only useful for leaching gold occurring in the +1 state, but also can be effectively employed on elemental gold which has been first treated to convert it to and maintain it in the +1 prior to the sulfurous acid leach. A method for accomplishing the oxidation of elemental gold and retaining it in the +1 state for subsequent leaching is described in the applicants's commonly assigned copending Patent Application.

An anion exchange resin is preferably added to the slurry after the formation of gold-sulfite complexes. Examples of anion exchange resins which may be used include those sold under the trade name Ionac AFP-329 by American Zeolite Corporation, Dowex 1X8, Dowex MSA-1 and Dowex 21K by Dow Chemical Co. and Amberlite IRA-400 by Rohm & Haas Co. Other anion exchange resins may also be used which are able to effectively adsorb the gold-sulfite complex. Anion exchange resins adsorb the gold-sulfite complex even in the presence of naturally occurring organic carbonaceous matter. Such carbonaceous matter is notorious for the pregrobbing of gold in a cyanide system. Activated carbons, as typically used in many processes, do not effectively adsorb the gold-sulfite complex. The process in accordance with the invention has been found to be effective in the leaching of ores which contain high amounts of the organic carbonaceous matter.

The anion exchange resin is added to the slurry as a granular material in the amount of about 20 pounds to about 100 pounds and preferably about 30 pounds to about 70 pounds per ton of ore. The resin is preferably dispersed in the slurry for a sufficient period of time to effectively adsorb the gold-sulfite complex. The anion exchange resin is then recovered from the slurry and the gold values are recovered by conventional eluting or stripping procedures. For example the resin may be eluted by acidic thiourea.

In a preferred embodiment of the invention, the leaching process is a continuous process which includes a plurality of tanks or treating vessels arranged in series such that the slurry flows sequentially through the tanks. Referring to FIG. 1, a refractory gold-bearing ore that has been ground to 100%—100 Tyler mesh is transferred via line 1 to agitated slurry tank 2. Sufficient water is added via line 3 to produce a slurry containing about 50% solids by weight. A chelating agent, for example EDTA, is also added via line 4 to the slurry tank 2 at the rate of about one pound of chelating agent per ton of ore on a dry basis. The chelating agent is preferably added while the slurry is being formed. If the chelating agent is added after the $SO_2$ injection is started, gold recovery efficiency has been found to be adversely affected. The best time for adding the chelating agent is immediately before the $SO_2$ is added to the slurry. The temperature of the ore slurry contained in slurry tank 2 may be controlled by steam 5 entering heat exchanger 6 and exiting through steam condensate outlet 7. Temperature control is not essential at this point in the process but may be beneficial for operational purposes.

The sulfurous acid leaching step is then begun. The slurry exits slurry tank 2 via line 9 and is transferred to agitated $SO_2$ addition tank 10. Although only one $SO_2$ addition tank is illustrated in FIG. 1, a plurality of such tanks may be used depending the characteristics of the ore and the amount of $SO_2$ which must be added. In the $SO_2$ addition tank 10, $SO_2$ is injected into the ore slurry via line 12. The $SO_2$ injected into the ore slurry contained in tank 10 rapidly dissolves in the aqueous phase of the slurry to form sulfurous acid. Sufficient $SO_2$ is rapidly added to lower the ore slurry pH to about 5.0 or less. If the ore slurry pH is not reduced below 5.0, the efficiency of gold extraction may suffer. The ore slurry pH is preferably maintained above about 3.0, and, most preferably, above about 4.0. The required amount of $SO_2$ is preferably about 30 to 100 pounds per ton of ore, although the precise amount required will depend on the alkalinity of the ore. Highly alkaline ores require the addition of more $SO_2$ to achieve the preferred pH range. Ores containing little $SO_2$-consuming material may require addition of alkaline material, such as lime, in order that the required amount of $SO_2$ can be added without causing the ore slurry pH to fall below 3.0. The bulk of $SO_2$ required in the process is preferably added in $SO_2$ addition tank 10 with a much smaller, maintenance amount added in agitated tank 18. The $SO_2$ is preferably added to $SO_2$ addition tank 10 and agitated tank 18 at a sufficiently fast rate to complete total $SO_2$ addition in about 0.5 to 2 hours. Slower $SO_2$ addition times require the use of larger quantities of $SO_2$ to lower the ore slurry pH to below 5.0.

In an alternative embodiment of the invention, aqueous sulfurous acid may be added to the ore slurry instead of injecting gaseous $SO_2$ into the slurry. Also, instead of adding $SO_2$ or sulfurous acid to the ore, the dry ground ore may be added to a sulfurous acid solution of sufficient strength to effect the leaching of gold from the ore. In still another embodiment, liquid $SO_2$ may be used as the $SO_2$ source instead of gaseous $SO_2$. The end result, as far as efficiency of gold recovery, for all these modes of operation should be almost identical.

The oxidizing agent, such as an oxygen-containing gas, preferably air, is injected via line 13 into the ore slurry contained in $SO_2$ addition tank 10. In the absence of adequate air, gold reduction may occur and less (+1) gold would therefore be available for extraction by the present process. Too much air promotes oxidation of sulfurous acid to sulfuric acid, thereby decreasing the sulfite concentration.

The temperature of the ore slurry in $SO_2$ addition tank 10 is maintained between about 35° F. and about 140° F. via heat exchanger 15, steam inlet 14 and steam condensate outlet 16. The temperature of the ore slurry should preferably be maintained between 75° F. and 120° F., and most preferably between 95° F. and 105° F. These temperature conditions are preferably maintained throughout the leaching process.

The ore slurry, containing the chelating agent EDTA, sulfurous acid and air is next transferred via line 17 to the first agitated RIP (Resin-In-Pulp) tank 18. A series of agitated RIP tanks 18, 28, 36, and 44 are arranged in a cascade from the first RIP tank 18 to the tailings discharge. The cascade of RIP tanks 18, 28, 36, and 44 forms the gold sulfite complex adsorption circuit. Although, for ease of illustration, four RIP tanks 18, 28, 36 and 44 are shown in FIG. 1, more or fewer RIP tanks may be used in an industrial plant. In the gold adsorption circuit, the sulfurous acid leaching operation, already begun as described above, is converted to a simultaneous sulfurous acid leaching/gold adsorption operation. Gold adsorption is accomplished by contacting the ore slurry with an anion exchange resin. In the preferred embodiment the resin is introduced to the circuit to flow countercurrent to the flow of the ore slurry. Barren anion exchange resin is introduced to the circuit in RIP tank 44 via line 50 and is transferred, sequentially, through RIP tanks 44, 36, 28, and 18 via lines 42, 34, 26, and 20. The anion exchange resin is conveyed in countercurrent flow to the ore slurry. The rate at which the anion exchange resin is moved through the RIP tanks depends on the gold content of the ore and the desired gold loading of the resin leaving tank 18 through line 20. The ore slurry is moved sequentially through RIP tanks 18, 28, 36 and 44 via lines 27, 35, 43, and 51.

In an alternative embodiment the anion exchange resin may be introduced into the process in the $SO_2$ addition tank 10. Preferably, however, the resin addition step is delayed until the bulk of the $SO_2$ has been added.

In RIP tank 18, additional $SO_2$ may be added if needed via line 21 to maintain the desired pH level and promote efficient formation of the gold-sulfite complex. At this point in the process, however, $SO_2$ addition is generally not necessary when processing many ores. Once $SO_2$ addition is discontinued, ore slurry pH will rise due to the natural alkalinity contained in the ore. The pH of a typical ore slurry will rise to between 6.0 and 8.0 by the time the ore slurry exits RIP tank 44 via line 51. The rise in the pH of the ore slurry, while not essential for the invention, may be beneficial for operational purposes since gold complexes produced at the higher pH range are at a higher valence state and should tend to adsorb onto the resin at a faster rate than those gold complexes formed at the lower pH range.

In preferred embodiments air is added to RIP tanks 18, 28, 36, and 44 via lines 22, 30, 38, and 46, respectively. For optimum results, the total amount of air injected into the ore slurry should be sufficient to provide between about 10 and 100 lbs. of oxygen per ton of ore. The resin entering RIP tank 18 via line 26 has previously passed, sequentially, through the other RIP tanks 44, 36, and 28, and is partially loaded with gold-sulfite complex. The mixture of resin and ore slurry containing the EDTA, sulfurous acid and air contained in RIP tank 18 is agitated via agitator 19 for a period of time long enough to provide intimate contact between all components of the slurry. As a result, additional gold-sulfite complex is adsorbed onto the resin in RIP tank 18. The gold-loaded resin is then transferred from RIP tank 18 by line 20. The expected gold loading on the resin exiting RIP tank 18 is at least about 20 ounces per ton of the anion exchange resin depending on the particular resin used in the extraction and the gold content of the ore.

The gold-loaded resin is forwarded to desorption vessels (not shown) where the gold-sulfite complex is chemically stripped from the exchange resin as known in the art. Acidic thiourea is one chemical that has been found to be effective for use in stripping the gold-sulfite complex from the resin. The acidic thiourea stripping solution preferably consisted of 10 grams per liter of thiourea and 25 gpl of hydrochloric acid. The temperature of the stripping solution is about 120° F. Other conventional stripping methods and solutions may be used. The regenerated resin would normally be reused in the process.

The partially gold-depleted ore slurry exits RIP tank 18 via line 27 and, as previously described, passes sequentially through RIP tanks 28, 36 and 44. In each RIP tank, the ore slurry and resin are preferably agitated to provide intimate contact between the ore slurry and resin and to promote additional gold-sulfite complex adsorbing onto the resin. Thus, in each successive RIP tank, the ore slurry is further depleted of its gold values.

The gold-depleted ore slurry exits the last RIP tank 44 in the cascade of RIP tanks 18, 28, 36 and 44 via line 51. The depleted ore slurry is transferred to a tailings pond.

The total time required for the sulfurous acid leaching operation inclusive of the time the $SO_2$ is first injected into the ore slurry until the time the ore slurry is transferred from the last RIP tank 44 is generally about 5 to 30 hours and preferably about 16 to 20 hours, depending on the ore characteristics and on operational constraints.

The nominal retention time of the ore slurry in the RIP circuit is generally about 3 to 29 hours, and preferably 10 to 19 hours.

In each of the RIP tanks 18, 28, 36 and 44, a conventional means of separating the resin from the ore slurry as known in the art may be provided to effect overall countercurrent flow between the resin and ore slurry. Screening is the most common method employed in the mineral processing industry and is generally preferred.

The anion exchange resin used to adsorb the gold-sulfite complex in the present invention can be either a strong base or weak base resin. A relatively coarse resin is preferably used to facilitate the screening operation referred to above, although the particle size will be dependent on the ore and the separation equipment used.

The above-described process is particularly effective on many gold ores wherein the refractory nature of the gold ores is caused by their content of carbonaceous and sulfidic material.

The described preferred mode of the invention is continuous in operation. The process can also be operated batchwise as one skilled in the industry would easily recognize. The advantages and disadvantages of continuous and batch processes are known throughout the industry.

Although the described preferred mode is a milling process, other milling and non-milling gold extraction applications exist for the process. For example, gold extraction operations employing heap and vat leaching, could make effective use of sulfurous acid as the leaching agent. Mill operations using precipitation methods rather than the described resin-in-pulp method might also be able to use the present invention. It should also be noted that the invented process, although directed herein to gold-containing ores, can also be used to extract gold from ore concentrates and mill waste materials, such as ore tailings. Other uses and modifications of the process are readily recognized by one skilled in the industry.

The essence of the present invention is the use of sulfurous acid as the leaching agent for gold associated with refractory ores. The features of the invention, namely use of chelating agents, an oxygen-bearing gas, and anion exchange resin, are all intended to promote the efficiency of the sulfurous acid leaching agent. The normal and preferred ranges employed in operating the $H_2SO_3$ RIP gold leaching/adsorption process are summarized below:

|  | $H_2SO_3$-RIP GOLD LEACHING PROCESS NORMAL AND PREFERRED RANGES | | |
|---|---|---|---|
|  | Normal Range | Preferred Range | Most Preferred |
| Ore Grind | 100%-65 Tyler Mesh | 100%-65 Tyler Mesh | — |
| Solids Content of Slurry | 35% to 55% | 40% to 50% | — |
| Slurry Temperature | 35° F. to 140° F. | 75° F. to 120° F. | 95° F. to 105° F. |
| Amount of Chelating Agent Used[1] | 0.04 to 2 | 0.8 to 1.4 | — |
| Amount of $SO_2$ Used[2] | 20 to 150 | 30 to 100 | — |
| $SO_2$ Addition Time | 0.5 to 2.0 hours | — | — |
| pH During $SO_2$ Addition | 3.0 to 5.0 | 4.0 to 5.0 | — |
| Amount of Air Used[3] | Equivalent to 10 to 100 | — | — |
| Duration of Air Injection[4] | 5 to 30 hours | 16 to 20 hours | — |

-continued

$H_2SO_3$-RIP GOLD LEACHING PROCESS
NORMAL AND PREFERRED RANGES

| | Normal Range | Preferred Range | Most Preferred |
|---|---|---|---|
| Amount of Anion Exchange Resin in Ore Slurry[5] | 20 to 100 | 30 to 70 | — |
| Retention Time of Ore in RIP Circuit | 3 to 29 hours | 10 to 19 hours | |

[1] lb. of agent per ton of ore
[2] lbs. of $SO_2$ per ton of ore
[3] lbs. of oxygen per ton of ore
[4] i.e. throughout entire leaching-RIP circuit
[5] lbs. of resin per ton of ore In summary, the process as described offers a new leaching agent, that is sulfurous acid, for leaching gold from refractory ores. The new leaching agent will not work on all ores but is very effective on many ores. Sulfurous acid appears most effective as a leaching agent when used on ores wherein the contained gold is believed to be in the aurous state. However, as is generally the case in extractive metallurgy, it is difficult to predict the response of a given gold ore to the process of this invention based on the characteristics of the ore. An effective exploratory method of establishing the response of a given gold ore to the process of this invention is through small scale tests, as described in Examples 9 through 15 hereinbelow.

In preferred embodiments of the invention the process is carried out as a continuous process by passing an aqueous ore slurry through a series of leach tanks. In alternative preferred embodiments, the process is carried out as a heap leaching process where a sulfurous acid solution is applied to ground or crushed ore in a manner similar to conventional cyanide heap leaching. The dissolved gold complex and the gold values are recovered in a manner similar to the slurry process discussed above, and the sulfurous acid is recycled.

The process of this invention has the advantage of not requiring oxidative pretreatment of carbonaceous material as do many conventional processes for treating refractory ores. Another important advantage of the invented process is the positive effects on the environment. The process can replace cyanide as the leaching agent for some gold ores. At the end of the leaching operation, the ore slurry stream has a near neutral pH. The effluent ore slurry stream contains a small amount of sulfite ions which are readily oxidizable and do not pose a serious environmental hazard.

EXAMPLES

The ore samples used in the following examples were obtained from Jerritt Canyon and Big Springs located near Elko, Nev. Although all the ores used in these examples are considered refractory, the reason for their individual refractoriness is often not completely understood. The major ore constituents are identified below. However, the degree of refractoriness cannot be determined with certainty from a review of the constituents, although such a review offers clues that are helpful. Because of their refractory nature, all of the ores listed below require some form of pretreatment, such as for example, oxidation via chlorination or oxidative roasting, before being subjected to standard cyanidation processes. All of the ore samples were ground to 100% −100 Tyler mesh unless otherwise specified. A controlled grind was performed using screening at 100 mesh and regrinding only the +100 mesh material to minimize production of fines. All percentages are by weight unless otherwise specified.

Feed A

A Jerritt Canyon carbonaceous ore (Roberts Mountain formation siltstone). Principal components: Au 0.289 oz/ton, 1.16% organic carbon, 1.25% total sulfur, 1.07% sulfide sulfur, 29% $CO_3$, 10.6% Ca, 5.5% Mg, 1.6% Fe, 37.9% $SiO_2$.

FEED B

A Jerritt Canyon carbonaceous ore (a 3:1 ore blend of Roberts Mountain formation siltstone and Hanson Creek formation limestone). Principal components: Au 0.188 oz/ton, 0.96% organic carbon, 1.0% total sulfur, 0.91% sulfide sulfur, 30.6% $CO_3$, 11.7% Ca, 3.5% Mg.

FEED C

A Jerritt Canyon (Upper North Generator Hill location-Hanson Creek formation limestone) ore. Principal components: Au 0.230 oz/ton, 0.40% organic carbon, 0.82% total sulfur, 0.74% sulfide sulfur, 36% $CO_3$, 16% Ca, 3.6% Mg.

FEED D

A Jerritt Canyon (Marlboro Canyon location-Hanson Creek formation limestone) ore. Principal components: Au 0.228 oz/ton, 0.32% organic carbon, 0.90% total sulfur, 0.85% sulfide sulfur, 37.5% $CO_3$, 21% Ca, 2.2% Mg.

FEED E

A Big Springs ore, mostly oxide with some carbonaceous ore. Principal components: Au 0.226 oz/ton, 0.15% organic carbon, 0.12% total sulfur, 0.08% sulfide sulfur, 0.7% $CO_3$, 2.5% Fe.

FEED F

A Jerritt Canyon (Upper North Generator Hill location-blend of mostly Hanson Creek formation limestone with some Roberts Mountain formation siltstone) ore. Principal components: Au 0.200 oz/ton, 0.31% organic carbon, 0.95% total sulfur, 0.18% sulfide sulfur, 7.2% $CO_3$, 2.0% Ca, 1.1% Mg.

FEED G

A Jerritt Canyon (West Generator Hill location-Roberts Mountain formation siltstone) ore. Principal components: Au 0.165 oz/ton, 1.05% organic carbon, 1.25% total sulfur, 1.08% sulfide sulfur, 21% $CO_3$, 6.8% Ca, 3.4% Mg.

Feeds A and B are examples of carbonaceous ores believed to contain most of the gold in the aurous state. Feeds C and D are believed to contain substantial aurous gold with some elemental gold. Feeds E and F are believed to contain some aurous gold but more elemental gold. Feed G is believed to contain some aurous gold, but may also have sulfide-encapsulated gold.

EXAMPLES 1 through 6

In each of these six Examples, 244 ml of water containing $SO_2$ and 200 g of Feed A ore were slurried together to give a 45% solids slurry at ambient temperature of about 75° F. The $SO_2$ was previously added to the water in an amount equivalent to about 100 lb/ton of ore. Air was injected into the slurries at a rate of 25 ml/min and in examples 2 through 6 various types of resin as identified in Table I were added to the slurries in the amount equivalent to 50 lb/ton of ore. In example 2, the resin was a cation exchange resin sold under the name Amberlie IRA-120 by Rohm & Haas Co. Example 1 was a control test in which no resin was added. After 5 hours, the air was shut off and in Examples 2 through 6 the resin was screened away from the slurry. All slurries were then filtered and the filtrates and tails separated. The tails were water washed twice. Percent gold extraction is based on the feed and tails gold assays using standard testing methods. The resins as received from the manufacturer were screened prior to testing and only +35 mesh particles were employed in this study. The percentages of gold extracted and the gold contents of the filtrates are shown in Table 1.

TABLE 1
COMPARISON OF $H_2SO_3$ LEACH
WITH AND WITHOUT RESIN
IN EFFICIENCY OF GOLD EXTRACTION

| Example | Type Resin Employed in Test | % Gold Extraction | Gold in Filtrate (mg/l) |
|---|---|---|---|
| 1 | Test Without Resin | 40 | >3.0 |
| 2 | Amberlite IRA-120 (Cation Exchange) | 40 | >3.0 |
| 3 | Ionac AFP-329 (Anion Exchange, Weak Base) | 52 | <0.05 |
| 4 | Dowex MSA-1 (Anion Exchange, Strong Base) | 58 | <0.05 |
| 5 | Dowex 1X8 (Anion Exchange, Strong Base) | 59 | <0.05 |
| 6 | Amberlite IRA-400 (Anion Exchange, Strong Base) | 62 | 0.06 |

Table 1 shows the improved gold extraction obtained by sulfurous acid leaching when an anion exchange resin is used to adsorb the gold (Examples 3 through 6) in contrast to the use of a cation exchange resin (Example 2) or no resin at all (Example 1). Since the dissolved gold is in the form of a dissolved anion complex, a cation exchange resin is not effective in adsorbing the gold complex. Table 1 also shows that without the presence of any resin, as in the case of Example 1, much of the gold remains in solution as a gold-sulfite complex. With an ineffective cation exchange resin, as in Example 2, the gold also remains in solution.

EXAMPLES 7 and 8

Examples 7 and 8 represent tests conducted to demonstrate the beneficial effect of injecting an oxygen containing gas into the slurry during leaching. In Example 7, about 244 ml of water containing 10 g of dissolved $SO_2$ was heated to 120° F. About 200 g of Feed A ore was then added and air injection was started at a rate of 25 ml/min. The anion exchange resin, +35 mesh Amberlite IRA-400, was added in the amount equivalent to about 50 lb/ton of ore. After 5 hours of leaching, the air was shut off and the resin was screened away from the slurry. The slurry was filtered to separate the filtrate from the tails. Percent gold extraction was based on feed and tails assays.

In Example 8, nitrogen was sparged for two hours through 244 ml of water containing 10 g of dissolved $SO_2$. The solution was heated to 120° F. During the heating, the solution was blanketed with nitrogen. Then, 200 g ore (Feed A which had been nitrogen purged in a container) was added to the $SO_2$ solution and nitrogen was used to blanket the slurry and prevent the introduction of air. About one minute later, +35 mesh Amberlite IRA-400 anion exchange resin was added to the slurry in an amount equivalent to about 50 lb/ton of ore. After 5 hours, the resin was screened away from the slurry. The gold extraction based on feed and tail assays is recorded in Table 2.

TABLE 2
COMPARISON OF $H_2SO_3$-RIP LEACH
WITH AND WITHOUT AIR IN
EFFICIENCY OF GOLD EXTRACTION

| Example | Nitrogen Blanket or Air Flow (ml/min) | Percent Gold Extraction |
|---|---|---|
| 7 | Air (10 ml/min) | 76 |
| 8 | Nitrogen | 34 |

The data recorded in Table 2 demonstrate that for similar processing conditions, the amount of gold that can be recovered from the ore is generally greater when an oxygen-containing gas is injected to the slurry during the formation of the gold-sulfite complex. As shown in Table 2 the efficiency of the gold recovery is essentially twice when air is injected compared to extraction in a nitrogen atmosphere. It was noted that the residual $H_2SO_3$ concentration was equivalent to 0.09 and 1.3 grams $SO_2$ per liter for Examples 7 and 8, respectively.

EXAMPLES 9 THROUGH 15

Examples 9 through 15 serve to illustrate the effectiveness of the $H_2SO_3$-RIP process compared to the conventional cyanidation CIL (Carbon-in-Leach) in extracting gold from the above-described refractory ores. The results summarized in Table 3 indicate that the $H_2SO_3$-RIP process is often effective on ores which are not efficiently handled by the conventional cyanidation-CIL (CN-CIL) process.

Feed ores A & B show good response to the $H_2SO_3$-RIP process. As discussed above, these ores are believed to contain most of their gold in the aurous state. The other feed ores contain less gold in the aurous state and do not yield their gold values easily to the $H_2SO_3$-RIP process.

TABLE 3
COMPARISON OF $H_2SO_3$-RIP
WITH CYANIDATION-CIL IN EFFICIENCY
OF GOLD EXTRACTION
PERCENT GOLD EXTRACTION

| Example | Feed Ore | $H_2SO_3$-RIP % | Cyanidation-CIL % |
|---|---|---|---|
| 9 | A | 84 | 0 |
| 10 | B | 84 | 0 |
| 11 | C | 62 | 31 |
| 12 | D | 58 | 15 |
| 13 | E | 23 | 65 |
| 14 | F | 23 | 72 |
| 15 | G | 35 | 4 |

PROCEDURES (FOR EXAMPLES 9 THROUGH 15)

$H_2SO_3$-RIP. Seven beakers were each charged with 245 grams of water solution containing dissolved $SO_2$ and EDTA and were heated to 100° F. Ground feed ores A through G having a mesh size of 100% −100 Tyler mesh were then added to the sulfurous acid solution to produce ore slurries containing 45% solids. The amount of sulfur dioxide used in these tests was equivalent to 40 lb/ton of ore, while the amount of EDTA was equivalent to 1 lb/ton of ore. Dowex 21K resin from Dow Chemical Co. was then added in the amount of 50 lb/ton-ore and air injection was started at a rate of 25 ml/min. After a total leach period of 20 hours, the test was stopped and the resin was screened away from the slurry. The slurry was filtered to separate the filtrate and the tails. Percent gold extraction was based on feed and tails assays.

CYANIDATION-CIL

Fleakers (800 ml) were charged with 200 g of feed ores A through G, slurried in 245 g of an aqueous cyanide solution which contained 1 g/l NaCN. The pH of the slurry in each fleaker was adjusted to 10.5 with lime. Five grams of activated carbon was added to each fleaker. The fleakers were then subjected to a rolling test at 30 RPM for 20 hours. The test was stopped and the carbon, liquor and tails were separated by screening and filtration, as in the $H_2SO_3$-RIP process described above. The amount of gold in the carbon and tails were determined using standard methods. The efficiency of gold extraction is recorded in Table 3.

The data of Table 3 demonstrate that where the gold in the ore is primarily in the aurous state, as in Feed A and Feed B, the sulfurous acid extraction is quite effective compared to the cyanide leach which showed no gold recovery. In the Feed C and Feed D ores which contained substantial aurous gold with some elemental gold, the $H_2SO_3$ extraction was 2 to 3 times more efficient than the cyanide leach. The Feed E and Feed F ores containing primarily elemental gold were less responsive to the $H_2SO_3$ extraction than to the cyanide leach but still yielded some of the gold to the new leaching process.

These Examples illustrate an effective exploratory method of testing the response of various gold ores to the process of this invention.

EXAMPLES 16 AND 17

In Examples 16 and 17, the A and B feed ores that performed so well with $H_2SO_3$-RIP treatment in Examples 9 and 10 were re-tested using different procedures. One of these procedures employed a pretreatment with chlorine prior to the standard CN-CIL process. After the chlorine pretreatment step, the ores were subjected to a cyanide leach as in Examples 9 and 10.

In the $H_2SO_3$-RIP treatment tests, for each of the Feed A and Feed B ores a 45% solids ore slurry containing 1 lb/ton of ore EDTA was heated to 100° F. Dowex 21K resin (+35M at 50 lb/ton) was added and $SO_2$ and air were injected. The $SO_2$ was added in the amount of 40 lb per ton of ore over a 2 hour period; air was injected at 25 ml/min for the duration of the tests. Agitation was provided and the slurry temperature maintained at 100° F. for a total leach period of 20 hours. The tests were then stopped and the resin was screened away from the slurry. The slurry was filtered to separate the filtrate and the tails. Percent gold extraction was based on feed and tails assays.

In tests involving chlorination followed by cyanidation, for each of the Feed A and Feed B ores a 45% solids ore slurry was chlorinated by injecting chlorine into the slurry for at least six hours. Feed ore A received 165 pounds of chlorine per ton of ore and Feed B received 125 pounds of chlorine per ton of ore. The sample was allowed to age until the residual chlorine had dissipated. The treated ore was subjected to the Cyanidation-CIL procedure as described in Examples 9 and 10.

TABLE 4
COMPARISON OF $H_2SO_3$-RIP WITH CHLORINATION-CYANIDATION-CIL IN EFFICIENCY OF GOLD EXTRACTION
Percent Gold Extraction

| EXAMPLE | FEED ORE | $H_2SO_3$-RIP % | Cl-CN-CIL % |
|---|---|---|---|
| 16 | A | 86 | 84 |
| 17 | B | 85 | 84 |

Table 4 shows the $H_2SO_3$-RIP and the Cl-CN-CIL processes to be about equally effective. However, the Cl-CN-CIL process requires the above-described chlorination step to oxidize the refractory components prior to cyanidation to effect gold extraction. The organic carbonaceous material contained in the ores was deactivated by the chlorination step. The highly refractory ores of this example required large amounts of chlorine which, in an industrial mill, increase the gold extraction costs to an unacceptable level. The sulfurous acid leaching step of the present process does not require any such chlorination pretreatment step. The $H_2SO_3$-RIP process also retains the advantage of being a non-cyanide process.

EXAMPLE 18 through 30

These thirteen Examples serve to evaluate the effect on gold extraction of varying the rate of $SO_2$ addition, the time of EDTA addition and the time of the anion exchange resin addition. The results of the tests are shown in Table 5, below.

Ore slurries containing 45% solids were prepared for each of these thirteen Examples from Feed Ore B by mixing 300 gm of Feed Ore B and 365 ml water. Water and ore were slurried and heated to 100° F. and then $SO_2$ was injected into the slurry. $SO_2$ usage was equivalent to 50 lb of $SO_2$ per ton of ore. The $SO_2$ was added over a period of 0.5 hours to 4.0 hours as recorded in Table 5. Air injection rate was 20 ml/min throughout each of the tests, except for Example 23 in which there was no air injection, but only minimal air was introduced through exposure of the slurry surface to air. EDTA (when used) was added to the slurries about 20 hours prior to the start of $SO_2$ injection, at the start of the $SO_2$ injection, or after the $SO_2$ injection was started at the time specified in Table 5. The resin was added at the start or after the start of $SO_2$ injection as indicated in Table 5. +20 mesh Dowex 21K resin was used. All tests ran 20 hours from the start of $SO_2$ injection. At the end of each test run, the resin was screened from the slurry and the leached ore and filtrate were separated. The amount of the gold extraction was based on tails and feed assays. The $SO_2$ addition time, the minimum pH, the time of addition of EDTA and the ion exchange resin and the percent of gold extracted from the ore are shown in Table 5. The final pH of each of the test runs was about 7.7.

TABLE 5

EFFECT ON PERCENT GOLD EXTRACTION OF VARYING PROCESS PARAMETERS - RATE OF $SO_2$ ADDITION, AND TIME OF ADDITION OF EDTA AND RESIN

| Example | $SO_2$ Addition Time (hr) | Minimum pH | Time of Addition EDTA | Time of Addition Resin | % Gold Extraction |
|---|---|---|---|---|---|
| 18 | 0.5 | 4.8 | None | Start | 73 |
| 19 | 0.5 | 4.6 | Start | Start | 84 |
| 20 | 0.5 | 4.4 | After ½ Hr. | Start | 81 |
| 21 | 1.0 | 4.7 | None | Start | 79 |
| 22 | 1.0 | 4.0 | Before | Start | 84 |
| 23* | 1.0 | 4.7 | Start | Start | 71 |
| 24 | 2.0 | 4.6 | None | Start | 80 |
| 25 | 2.0 | 4.1 | Before | Start | 84 |
| 26 | 2.0 | 4.1 | Start | Start | 84 |
| 27 | 2.0 | 4.0 | Start | After 2 Hrs. | 85 |
| 28 | 2.0 | 4.2 | Start | After 5 Hrs. | 75 |
| 29 | 4.0 | 5.8 | None | Start | 56 |
| 30 | 4.0 | 5.2 | Start | Start | 55 |

NOTES:
*Negligible air (no air flow) - minimal air taken in by agitation only.

As shown in Table 5 the efficiency of the gold recovery is improved when the $SO_2$ is added to the slurry over a period of about 0.5 to 2 hours. Gold recovery is also improved when the chelating agent and the ion exchange resin are added early in the leaching process. The dependence of the efficiency of the gold extraction on the pH of the slurry is also demonstrated in the data of Table 5. When $SO_2$ is added over a period in excess of 2 hours, the pH of the slurry does not fall below pH 5.0. As demonstrated in Table 5, lower gold recoveries are typically experienced when the pH is above about pH 5.0.

What is claimed is:

1. A method of leaching gold from gold-containing ore comprising leaching said ore with a sulfurous acid leaching agent to form a gold-sulfite complex.

2. The method of claim 1 comprising adding at least one mild oxidizing agent to the sulfurous acid leaching agent during said leaching.

3. The method of claim 1 comprising adding at least one chelating agent to the sulfurous acid leaching agent.

4. The method of claim 1 wherein said leaching takes place in a slurry of ground gold-containing ore suspended in the sulfurous acid leaching agent.

5. The method of claim 4 comprising separating said gold-sulfite complex from the slurry by admixing an ion exchange resin with the slurry for an effective time to adsorb said complex and separating said resin from the slurry.

6. The method of claim 5 comprising recovering gold values from said resin following the separation of said resin from the slurry.

7. The method of claim 5 wherein said ion exchange resin is an anion exchange resin.

8. The method of claim 4 wherein said slurry is formed by introducing sulfur dioxide into an aqueous slurry of gold-containing ore to form sulfurous acid in an aqueous phase of the slurry.

9. The method of claim 8 comprising adding said sulfur dioxide as a gas.

10. The method of claim 4 wherein said slurry is formed by blending ground gold-containing ore with aqueous sulfurous acid.

11. The method of claim 4 wherein said sulfurous acid is present in the slurry in an amount whereby the pH of the slurry is maintained at about pH 3.0 to about pH 5.0 during at least part of said leaching step.

12. The method of claim 1 wherein said ore is a refractory gold-containing ore containing organic carbonaceous matter, sulfidic matter or mixtures thereof.

13. A method of recovering gold values from refractory gold-containing ore comprising the steps of
   a) forming an aqueous slurry of a ground gold-containing ore;
   b) introducing a source of sulfurous acid to said slurry in an amount and at a rate sufficient to adjust the pH of said slurry to about 3.0 to about 5.0;
   c) leaching the gold from the ore and forming a gold-sulfite complex; and
   d) separating the gold-sulfite complex from the slurry and recovering the gold values from the complex.

14. The method of claim 13 wherein said ground ore is about −100 Tyler mesh.

15. The method of claim 13 wherein said slurry is admixed with at least one chelating agent.

16. The method of claim 13 comprising introducing an oxygen-containing gas into said slurry.

17. The method of claim 13 wherein said slurry contains about 50% by weight solids.

18. The method of claim 13 wherein the source of said sulfurous acid is gaseous $SO_2$ introduced to said slurry to form sulfurous acid.

19. The method of claim 13 wherein the source of said sulfurous acid is aqueous sulfurous acid.

20. The method of claim 18 comprising introducing $SO_2$ to the slurry in the amount of about 30 to about 100 pounds per ton of ore.

21. The method of claim 16 wherein said oxygen-containing gas is air.

22. The method of claim 13 comprising contacting said slurry with at least one anion exchange resin for sufficient time to absorb said gold-sulfite complex and separating said resin and adsorbed gold-sulfite complex from said slurry.

23. The method of claim 16 wherein said oxygen-containing gas is air and is introduced to the slurry in the amount equivalent to provide about 10 lbs. to 100 lbs. of oxygen per ton of ore.

24. A process for recovering gold values from refractory gold-containing ores comprising the steps of:
   a) grinding a gold-containing ore to −100 Tyler mesh;
   b) mixing the ground ore with water to produce an ore slurry;
   c) adding a chelating agent to the ore slurry;
   d) heating the ore slurry-chelating agent mixture;
   e) admixing sulfurous acid with the ore slurry-chelating agent mixture to form a sulfurous acid containing slurry;
   f) leaching the gold from the ore slurry in the presence of an oxygen-containing gas, whereby the ore is intimately contacted with the sulfurous acid for sufficient time to leach the gold from the ore and produce a gold-sulfite complex;
   g) contacting the ore slurry with an anion exchange resin to effect adsorption of said gold-sulfite complex onto said anion exchange resin; and h) separating said anion exchange resin from said ore slurry and recovering the gold values from said anion exchange resin.

25. The process of claim 24 wherein said ore is a refractory ore containing carbonaceous material, sulfidic material or mixtures thereof.

26. The process of claim 24 wherein the ore slurry contains about 40% to 50% by weight solids.

27. The process of claim 24 wherein the slurry is contacted with the anion exchange resin simultaneous with said leaching step.

28. The process of claim 24 wherein the chelating agent is selected from the group consisting of EDTA, nitilotriacetic acid, diethylenetriaminepentacetic acid, methanediphosphonic acid, sodium hexametaphosphate and mixtures thereof.

29. The process of claim 24 wherein EDTA is added to the slurry in the amount of about one pound of EDTA per ton of ore.

30. The process of claim 24 wherein the oxygen-containing gas is air added to the slurry in an amount equivalent to provide about 10 lbs. to 100 lbs. of oxygen per ton of ore.

31. The process of claim 24 wherein said sulfurous acid is admixed in an amount sufficient to lower the pH of the ore slurry from about 3.0 to about 5.0.

32. The process of claim 24 comprising adding $SO_2$ to the ore slurry in the amount of about 30 to about 100 pounds of $SO_2$ per ton of ore to form said sulfurous acid.

33. The process of claim 32 is comprising adding the $SO_2$ to the ore slurry over a period of time of about 0.5 hour to 2 hours.

34. The process of claim 24 wherein aqueous sulfurous acid is added to the ore slurry.

35. The process of claim 24 wherein the ground ore is added to a sulfurous acid solution of sufficient strength to effect said leaching of gold.

36. The process of claim 24 comprising contacting ore slurry and the anion exchange resin in a plurality of stages with the ion exchange resin flowing in countercurrent direction to said slurry.

37. The process of claim 24 comprising maintaining the temperature of the ore slurry during said sulfurous acid leaching at a temperature between 75° F. and 120° F.

38. The process of claim 24 comprising maintaining the temperature of the ore slurry during sulfurous acid leaching at about 95° F.–105° F.

39. The process of claim 24 comprising leaching the gold from the ore for about 5 to about 30 hours.

40. The process of claim 24 comprising leaching the gold from the ore for about 16 to 20 hours.

41. The process of claim 24 wherein the anion exchange resin is a strong base resin.

42. The process of claim 24 wherein the anion exchange resin is a weak base resin.

43. The process of claim 24 comprising recovering the gold values from the anion exchange resin by chemical stripping with an acidic thiourea solution, wherein said acidic thiourea solution contains about 10 grams per liter of thiourea and 25 grams per liter of hydrochloric acid.

44. A continuous process for recovering gold values from refractory gold-containing ores whose refractory nature is caused by their content of carbonaceous and sulfidic material, said process comprising the steps of:
   a) forming an aqueous slurry of ore having a particle size of $-100$ Tyler mesh;
   b) adding EDTA to the ore slurry in an amount of about one pound of EDTA per ton of ore;
   c) heating the ore slurry to a temperature of 75°–120° F.;
   d) injecting sulfur dioxide into the heated ore slurry, thereby forming sulfurous acid at a sufficient rate to lower the pH of the heated ore slurry to the range of about 3.0 to about 5.0;
   e) injecting air into the slurry in an amount equivalent to provide between about 10 and 100 lbs. of oxygen per ton of ore, and simultaneously, subjecting the heated ore slurry-EDTA-sulfurous acid-air mixture to a sulfurous acid leaching step, wherein the mixture constituents are intimately contacted with each other for sufficient time to leach the gold from the ore thereby producing a gold-sulfite complex;
   f) thereafter contacting the heated slurry resulting from step (e) in a plurality of stages with anion exchange resin moving in countercurrent flow to the slurry to effect adsorption of said gold complex onto said anion exchange resin; and
   g) recovering said gold values from said anion exchange resin.

45. The process of claim 44 comprising injecting $SO_2$ in the amount of about 30 to 100 pounds of $SO_2$ per ton of ore.

46. The process of claim 44 comprising injecting the $SO_2$ into the ore slurry over a period of about 0.5 hour to 2 hours.

47. The process of claim 44 comprising adding sulfurous acid to the ore slurry.

48. The process of claim 44 wherein the ground ore is added to a sulfurous acid solution of sufficient strength to effect said leaching of gold.

49. The process of claim 44 wherein the temperature of the ore slurry during sulfurous acid leaching is maintained at about 75° to 120° F.

50. The process of claim 44 wherein the anion exchange resin used is a strong base resin.

51. The process of claim 44 wherein the anion exchange resin used is a weak base resin.

52. The process of claim 44 comprising leaching the ore slurry for about 16 to 20 hours.

* * * * *